United States Patent [19]

Leupold et al.

[11] Patent Number: 5,349,258
[45] Date of Patent: Sep. 20, 1994

[54] PERMANENT MAGNET STRUCTURE FOR USE IN ELECTRIC MACHINERY

[75] Inventors: Herbert A. Leupold, Eatontown; Ernest Potenziani, II, Ocean, both of N.J.

[73] Assignee: The United States of America as represented by the Secretary of the Army, Washington, D.C.

[21] Appl. No.: 129,883

[22] Filed: Sep. 30, 1993

Related U.S. Application Data

[63] Continuation of Ser. No. 436,406, Nov. 14, 1989, Pat. No. 5,280,209.

[51] Int. Cl.$^5$ .................. H02K 21/12; H02K 23/04; H02K 21/26
[52] U.S. Cl. .................. 310/154; 310/156; 310/256
[58] Field of Search ............... 310/152, 154, 156, 256; 335/219, 229, 302, 304, 306

[56] References Cited

U.S. PATENT DOCUMENTS

| | | | |
|---|---|---|---|
| 3,168,686 | 2/1965 | King et al. | 335/306 |
| 3,334,254 | 8/1967 | Kobar | 310/156 |
| 4,004,167 | 1/1977 | Meckling | 310/154 |
| 4,185,262 | 1/1980 | Watanabe et al. | 335/302 |
| 4,477,744 | 10/1984 | Gerber | 310/156 |
| 4,536,230 | 8/1985 | Landa et al. | 335/305 |
| 4,547,758 | 10/1985 | Shimizu et al. | 310/156 |
| 4,888,512 | 12/1989 | Shimizu | 310/156 |
| 5,013,951 | 5/1991 | Stadnik et al. | 310/156 |
| 5,014,028 | 5/1991 | Leupold | 335/306 |
| 5,204,572 | 4/1993 | Ferreira | 310/156 |

FOREIGN PATENT DOCUMENTS

WO89/08346 9/1989 World Int. Prop. O. .

OTHER PUBLICATIONS

Slemon and Straughen, text book titled: "Electric Machines", Oct. 1982, pp. 74–75.

*Primary Examiner*—Steven L. Stephan
*Assistant Examiner*—Clayton E. LaBalle
*Attorney, Agent, or Firm*—Michael Zelenka; John M. O'Meara

[57] ABSTRACT

Magnetic circuit losses due to unnecessary magnetic fields are greatly curtailed or eliminated relative to the permanent magnet structures of electric machinery, without employing a conventional shunt or pole pieces. At least one coaxial cylinder of magnetic material is included in each permanent magnet structure of the invention and is magnetized to provide individual magnetic fields between sets of north and south poles on only one cylindrical surface thereof. Each of the cylinders is constructed from a plurality of segments in one preferred embodiment thereof and magnetically rigid materials are utilized to enhance the field magnitudes in another preferred thereof. Segments having a substantially triangular cross sectional configuration are utilized in other preferred embodiments, while flux contributions from at least three segments combine to sustain each set of north and south poles in still other preferred embodiments.

38 Claims, 3 Drawing Sheets

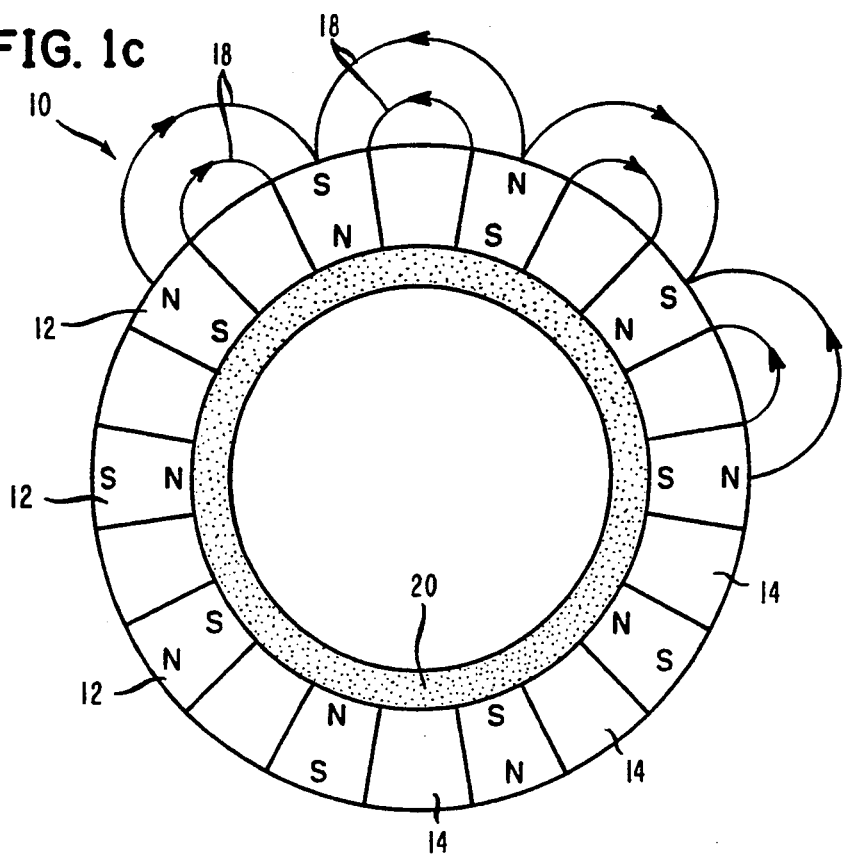
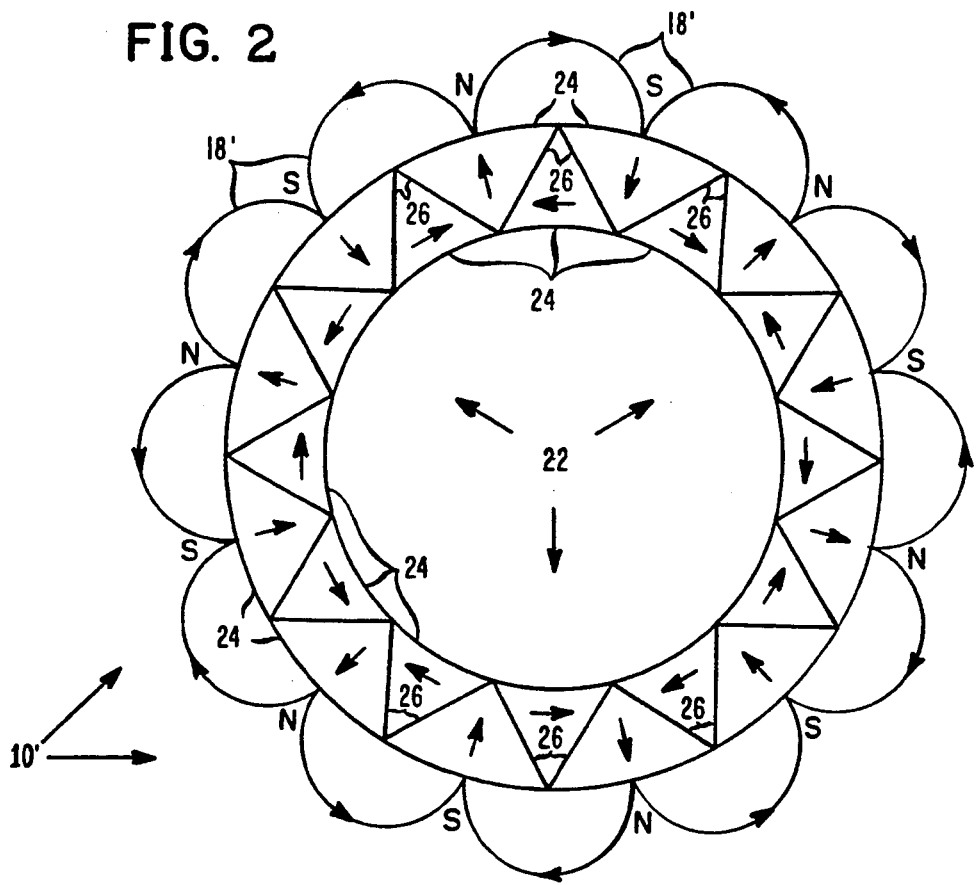

5,349,258

PERMANENT MAGNET STRUCTURE FOR USE IN ELECTRIC MACHINERY

GOVERNMENT INTEREST

With Herbert A. Leupold and Ernest Potenziani II as joint inventors, this application is filed under 37 CFR 1.53 as a continuation of a pending application which was filed Nov. 14, 1989 and to which Ser. No. 07/436,406 was assigned by the PTO, now U.S. Pat. No. 5,280209. The invention described herein may be manufactured, used, and licensed by or for the Government for governmental purposes without payment to us of any royalties thereon.

BACKGROUND OF THE INVENTION

The present invention relates generally to permanent magnet structures and more particularly, to those structures which are utilized in electric machinery such as motors and generators.

As is well known in the art of electric machinery, the flux density of conventional permanent magnet structures is less than optimal due to various magnetic losses. The most common magnetic losses encountered with permanent magnet structures in electric machinery are due to flux leakage or unnecessary reluctance in the magnetic circuit thereof. When, traditional magnetic materials, such as Alnico, are utilized in these permanent magnet structures, adjacently disposed north and south poles can not be arranged on a cylindrical surface within the electric machinery without encountering flux leakage from corresponding north and south poles remotely located from that cylindrical surface. Although shunting rings can be incorporated to reduce the reluctance encountered from such flux leakage in some electric machinery designs, they present difficulties due to their very cumbersome nature. Pole pieces can be incorporated in those electric machinery designs where shunting rings are not possible but they do nothing more than reduce the reluctance encountered from flux leakage. Therefore, shunting rings and pole pieces do not serve to reduce the flux leakage encountered. Furthermore, as disclosed by M. Marinescu, et al in their paper entitled NEW RARE-EARTH PERMANENT MAGNET STRUCTURE FOR PRODUCING OPTIMAL MAGNETIC FIELDS IN MAGNETIC SEPARATION DEVICES, COMPARISON WITH PREVIOUS SYSTEMS; pages 163-181 of the Proceedings of the Ninth International Workshop on Rare-Earth Magnets and Their Applications, and Fifth International Symposium on Magnetic Anisotropy and Coercivity In Rare Earth Transition Metal Alloys which were held from Aug. 31, 1987 through Sep. 3, 1987, arrangements of magnetized segments fabricated from magnetically rigid materials are known to be useful for reducing flux leakage.

SUMMARY OF THE INVENTION

It is the general object of the present invention to provide a permanent magnet structure for use in electric machinery which precludes flux leakage from remotely located poles or pole faces by eliminating such pole faces.

It is a specific object of the present invention to accomplish the above-stated general object for electric machinery rotors.

It is another specific object of the present invention to accomplish the above-stated general object for electric machinery stators.

These and other objects are accomplished in accordance with the present invention by magnetizing at least one hollow cylinder of magnetic material to derive a plurality of magnetic circuits which pass externally between pole faces on only one cylindrical surface of the cylinders. Usually, the magnetic circuits pass through the outer cylindrical surface of the cylinders when the permanent magnet structure is for incorporation on rotors and through the inner cylindrical surface of the cylinders when the permanent magnet structure is for incorporation on stators. Each cylinder is constructed from a plurality of magnetized segments in the preferred embodiments of the invention. These segments may have various cross sectional configurations which in the preferred embodiments are only disclosed as substantially triangular. Otherwise, the configuration of these segments may extend parallel to the longitudinal axis of the cylinder for various distances which in the preferred embodiments are only disclosed as the full length thereof.

The scope of the present invention is only limited by the appended claims for which support is predicated on the preferred embodiments hereinafter set forth in the following description and the attached drawings wherein like reference characters relate to like parts throughout the several figures.

DESCRIPTION OF THE DRAWINGS

FIGS. 1a, 1b, 1c, are end views of permanent magnet structures which are commonly found in electric machinery;

FIG. 2 is an end view of a permanent magnet structure in accordance with the invention and of the type which incorporates on a rotor in electric machinery;

DESCRIPTION OF THE PREFERRED EMBODIMENTS

Permanent magnet structures have many applications of which the most common is found in electric machinery, such as motors and generators. A rotor turns relative to a stator, about the rotational axis of either a motor or generator and a clearance, called an air gap, exists therein between the rotor and stator. The magnitude of this air gap is made as small as possible to limit the reluctance encountered therein and consequently, the magnetic losses incurred therefrom. A permanent magnet structure is incorporated on either the rotor or stator and directs a magnetic field into the air gap, which interacts with the other of either the rotor or stator. In a motor, this magnetic field interacts with another magnetic field of changing polarity to develop the torque which turns the rotor while in a generator, it interacts with windings to induce current therein.

Figure 1A:
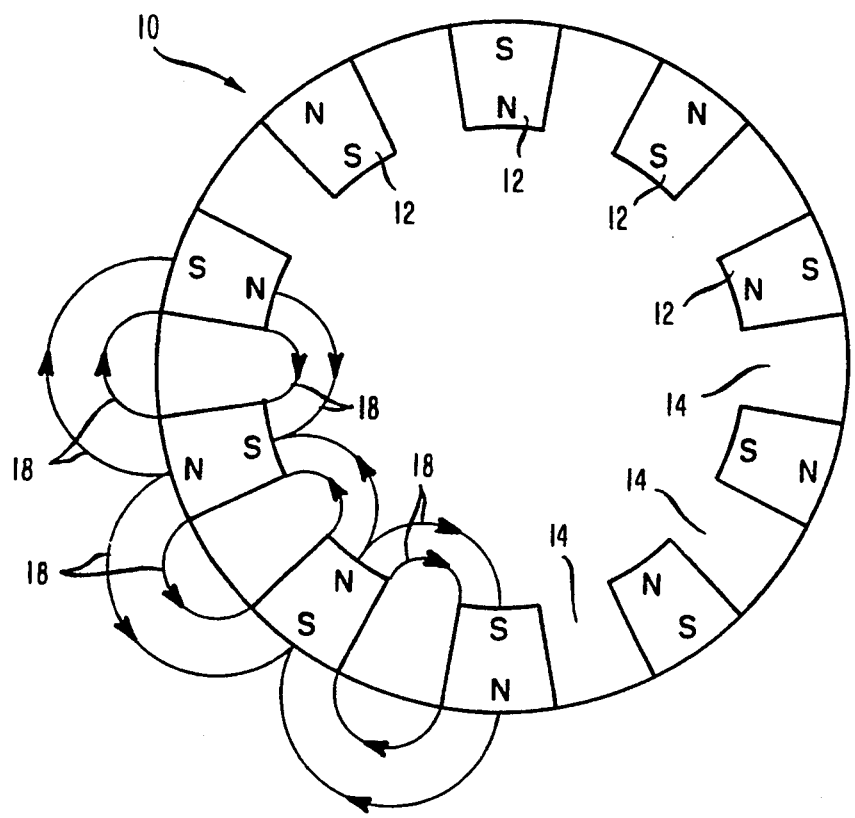
Figure 1B:
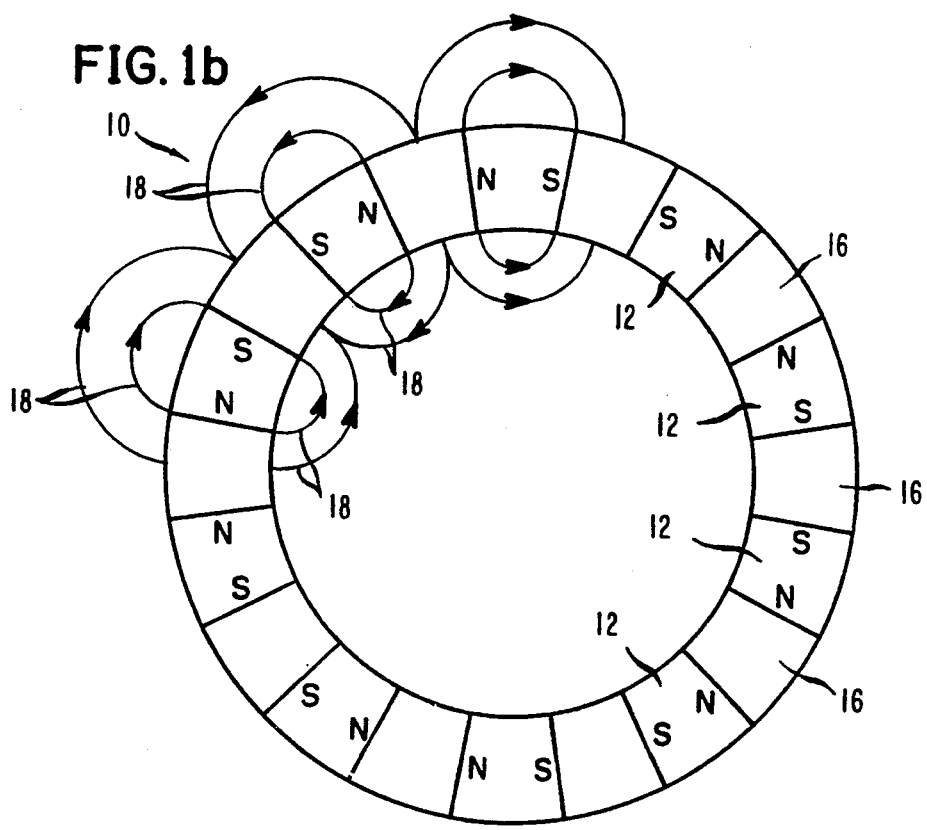

FIGS 1a and 1b illustrate different types of permanent magnet structures 10 which are conventionally utilized on either rotors or stators and in either motors or generators. Of course, all such permanent magnet structures 10 have a cylindrical configuration and include magnetic elements 12 which present North (hereinafter N) and South (hereinafter S) pole densities on separate surfaces that are commonly known in the magnetic arts as pole faces. Each magnetic element 12 serves as a source of magnetomotive force which sustains the magnetic fields that extend to and from its poles or pole faces. Adjacent magnetic elements 12 are separated by air spaces 14 in FIG 1a and the pole faces of each magnetic element 12 therein are aligned along a cylindrical radius of the permanent magnet structure 10.

Pole pieces 16 are disposed between adjacent magnetic elements 12 in FIG. 1b and the pole faces of each magnetic element 12 therein are aligned about the cylindrical circumference of the permanent magnet structure 10. The magnetic circuit patterns of the permanent magnet structures 10 in FIGS. 1a and 1b are similar in that magnetic fields or flux 18 extend from both the inner and outer cylindrical surfaces thereof. Of course, only the magnetic fields 18 extending from the outer cylindrical surface of the permanent magnet structures 10 are utilized on a rotor and only the magnetic fields 18 extending from the inner cylindrical surface of the permanent magnet structures 10 are utilized on a stator. Therefore, the magnetic fields 18 extending from one cylindrical surface of the permanent magnet structures 10 in FIGS. 1a and 1b are unnecessary and only add magnetic losses in the magnetic circuit thereof, due to the reluctance encountered thereby.

Such magnetic losses may be reduced for some conventional arrangements of magnetic elements 12 by precluding the path of the unnecessary magnetic fields 18 through air with a shunting means 20, as illustrated in FIG. 1c for the permanent magnet structure 10 of FIG 1a. Iron or any other material with high permeance is disposed as the shunting means 20 in FIG. 1c the permanent magnet structure 10 thereof would be for incorporation on a rotor because the magnetic fields 18 to be utilized extend from the outer cylindrical surface thereof. Of course, the shunting means 20 could be disposed to preclude the path of the magnetic fields 18 which extend from the outer cylindrical surface on the permanent magnet structure 10 of FIG. 1c. This structure 10 would then be for incorporation on a stator because the magnetic fields 18 to be utilized would then extend from the inner cylindrical surface thereof. However, the shunting means 20 is not a welcomed addition to electric machinery because it increases the overall dimensions, weight and cost thereof. Furthermore, the shunting means 20 can not be applied to reduce magnetic losses due to unnecessary magnetic fields 18 in all conventional arrangements of magnetic elements 12, in the permanent magnet structures 10. This can readily be understood from the permanent magnet structure 10 of FIG. 1b for which shunting the magnetic fields 18 that extend from either the inner or outer cylindrical surfaces thereof, serves to shunt the magnetic fields 18 that extend from both the inner and outer cylindrical surfaces thereof. Another way of explaining this is that each magnetic element 12 in the permanent magnet structure 10 of FIG. 1b would thereby have its N pole face shunted to it S pole face regardless of whether the shunting means 20 was disposed against the inner or outer cylindrical surface thereof. Of course, the pole pieces 16 in the permanent magnet structure 10 of FIG. 1b do serve to reduce the magnetic losses by limiting the reluctance encountered when the magnetic fields 18 pass between the N pole faces and S pole faces however, they in no way reduce flux leakage or the unnecessary magnetic fields 18.

Figure 3:
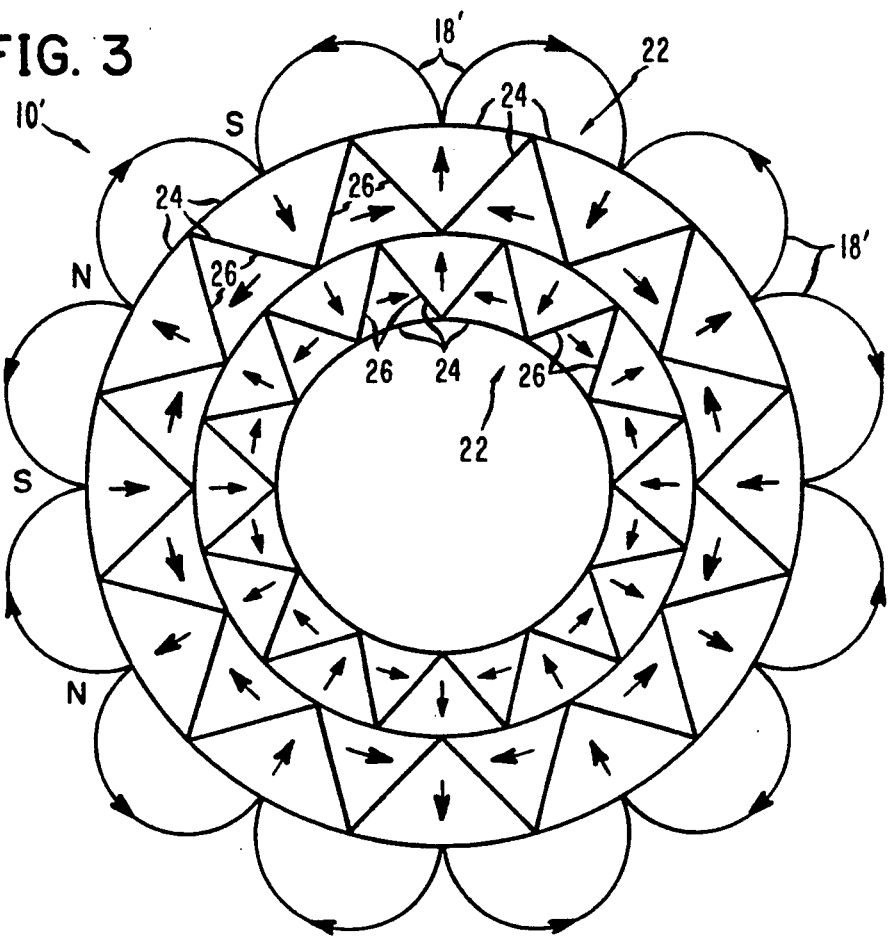
FIG. 3 is an end view of another permanent magnet structure in accordance with the invention and of the type which incorporates on a rotor in electric machinery.
Figure 4:
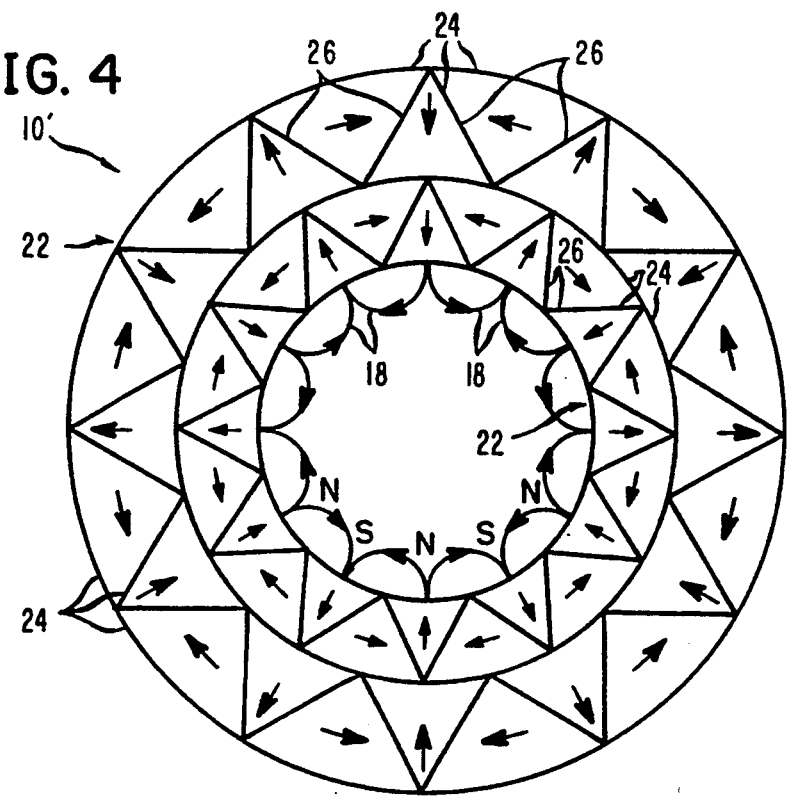
FIG. 4 is an end view of still another permanent magnet structure in accordance with the invention and of the type which incorporates on a stator in electric machinery.

A permanent magnet structure 10' in accordance with one preferred embodiment of the present invention, is illustrated in FIG. 2. The magnetic losses caused in electric machinery by the unnecessary magnetic fields 18 which extend from conventional permanent magnet structures 10, as explained above relative to FIGS. 1a and 1b, are greatly curtailed or eliminated in the magnet structure 10' without incorporating the shunting means 20. At least one hollow cylinder 22 of magnetic material having inner and outer cylindrical surfaces, may be included in the magnet structure 10'as shown in FIGS. 2-4. The cylinders 22 are magnetized to derive magnetic fields 18', which are attributable to pole faces on only one cylindrical surface thereof. Because the magnetic fields 18', extend from the outer cylindrical surface in FIG. 2, the magnet structure 10' therein, would be for incorporation on the rotor of electric machinery. However, the magnetic fields 18', could extend from the inner cylindrical surface of the magnet structure 10', which would then be for incorporation on the stator of electric machinery as is discussed hereinafter relative to the magnet structure 10' of FIG. 4.

As is apparent from U.S. Pat. No. 4,837,542 which issued on June 6, 1989 to Herbert A. Leupold, a co-applicant hereto, and the publication of K. Halbach referenced in that patent, magnetically rigid (hereinafter MR) materials are well known to those skilled in the magnetic arts. Some ferrites, for example particular Barium Ferrites, and rare-earth alloys, for example Neodymium-Iron-Boron and Rare Earth Cobalts such as Samarium Cobalt or Cerium Cobalt, have been utilized or are being contemplated for use as MR materials. The most pronounced characteristic of MR materials is their very high coercivity (field magnitude required to demagnetize) relative to that of traditional magnetic materials. This characteristic may be viewed as the means by which various magnetic circuit effects can be attained with MR materials that are unattainable with traditional magnetic materials, for example field transparency and flux path predictability. As to the former, external magnetic fields up to some magnitude greater than the remanence (magnetized level) of MR material will pass therethrough without affecting the magnetic orientation thereof. A resultant field therefore occurs as the vector sum of the external field and the field sustained by the MR material. As to the latter, the magnitude and direction of the magnetization is constant throughout any individual piece of MR material, which facilitates the construction of field sources for sustaining magnetic circuits that include unconventional flux paths and even a magnetic circuit configured to confine a magnetic field in a cavity. Consequently, MR materials are utilized in embodiments of the present invention.

It is not yet practical to magnetize single piece cylinders 22 for the present invention. Therefore, each cylinder 22 is constructed from a plurality of magnetic material segments 24 which are adjacently disposed and contiguous, with an interfacing boundary therebetween, as shown in FIGS. 2-4. In the preferred embodiments of the invention, each such segment 24 extends longitudinally for the full length of its cylinder 22. However, only a partial extension along that length is certainly possible in other embodiments. Although segments 24 having other cross sectional configurations could be utilized in various embodiments of the invention, only segments 24 having a substantially triangular cross sectional configuration are disclosed herein. As shown in FIGS. 2–4, the triangular cross section of each segment 24 includes a base on one cylindrical surface and a vertex on the other cylindrical surface, with the base and vertex respectively of any specific segment being located on the cylindrical surface opposite to that on which the base and vertex respectively of its adjacent segments are located. Furthermore, the segments 24 in the cylinders 22 of this disclosure are arranged to provide six sets of N and S pole faces but could be arranged to either increase or decrease this number of N and S pole faces. The magnitude and direction of the magnetization in each segment 24 are constant when MR material is utilized, due substantially to the high coercivity of that material. A vector representation of the magnetization is given by an arrow which extends from the S pole face to the N pole face in each segment 24. For the preferred embodiments of FIGS. 2, 3 and 4 the magnitude of this vector is the same for all segments 24. Fabrication of each segment 24 could be accomplished with the configuration thereof first being obtained in the magnetic material selected and then applying the magnetism thereto using any of the well known magnetization techniques.

As shown in FIG. 2, the segments 24 in each cylinder 22 are arranged according to the number of N and S pole faces which are required in the magnetic circuit to establish the desired number of independent magnetic fields 18'. Of course, the N and S pole faces on the magnet structure 10' are alternately disposed thereabout, with each magnetic field 18' extending externally therefrom between adjacently disposed N and S pole faces thereon. Without any further explanation therefore, those skilled in the magnetic arts will realize that each magnetic field 18' relates to a separate and independent magnetic circuit and that the magnetic circuit mentioned previously herein is the cumulative result of such separate and independent magnetic circuits.

Each such magnetic field 18' is sustained by a combination of at least three segments 24 in each cylinder 22. At Least one segment 24 passes the magnetic circuit of that magnetic field 18' from the magnet structure 10' in a radial direction through one cylindrical surface thereof, at the N pole face of that magnetic field 18'; at least one segment 24 receives the same magnetic circuit into the magnet structure 10' in a radial direction through the same cylindrical surface thereof, at the S pole face of that magnetic field 18'; and at least one segment 24 passes the same magnetic circuit within the magnet structure 10' between at least the other two segments 24, in a direction tangent to the cylindrical surface other than that cylindrical surface from which the magnetic fields 18' extend. However, as will be readily understood from FIG. 2, each segment 24 which passes the magnetic circuit in a radial direction is the terminus for two separate magnetic fields 18' and therefore on a numerical basis, each magnetic field 18' is sustained by a minimum of two segments 24. Furthermore, when all segments 24 are substantially triangular in cross section, those segments 24 which direct the magnetic circuit radially in each cylinder 22 are configured and arrange for external exposure on only one cylindrical surface thereof, while those segments 24 which direct the magnetic circuit tangentially in each cylinder 22 are configured and arranged for external exposure on only the other cylindrical surface thereof. Therefore, the magnetic fields 18' extend from pole faces on only one cylindrical surface of the magnet structure 10' and consequently, as explained previously herein at the bottom of page 7, magnetic losses caused by unnecessary magnetic fields are greatly curtailed or eliminated in the magnetic circuit thereof, without employing any shunting means 20.

The direction of the magnetic circuit through each cylinder 22 changes abruptly at each boundary 26 between adjacent segments 24. As shown in FIG. 2, one of the adjacent segments 24 is magnetized in the radial direction and the other is magnetized in the tangential direction, with the boundary 26 therebetween disposed at an oblique angle relative to both cylindrical surfaces of the cylinder 22. When that oblique angle is the 45° shown in FIG. 2, the orientations of the boundaries 26 are such that equal and opposite vector components of magnetization perpendicular thereto in the segments 24 on either side thereof will cancel each other. This ensures that the net pole density along each boundary 26 is zero because such equal and opposite perpendicular components of magnetization induce equal and opposite pole densities. For practical purposes, the magnetic structure 10', sustains no pole faces on the inner surface of rotors or outer surface of stators because the magnetization thereacross is substantially tangential to those surfaces and consequently, pole-inducing perpendicular components are nonexistent thereacross. Of course, this is not absolutely true in FIG. 2 where the segments 24 are cross sectionally configured to have circular arcs on the outer or inner cylinder surface of interest, but would be absolutely true if those segments 24 were cross sectionally configured to have circular chords on the outer or inner cylinder surface of interest. Furthermore, it should be realized without further discussion that this is also absolutely true when the segments 24 are cross sectionally configured to have circular arcs on the outer or inner cylinder surface of interest and are magnetized to have the magnetic orientation thereof directed in the same circular arc, as was shown in FIG. 5 of the above mentioned patent application Ser. No. 07/436,406. Consequently, when the cylinders 22 contain only segments 24 with triangular cross sections, the only pole faces existing in the magnetic circuit of the magnet structure 10' are those on the inner surface of a stator as demonstrated in FIG. 4, or the outer surface of a rotor as demonstrated in FIG. 3. With the pole faces disposed in this manner, the ratio of the useful or desirable magnetic fields 18' to the unnecessary fields or leakage flux is greatly enhanced for the magnet structures 10'.

When more than one cylinder 22 is disposed in the magnet structure 10', as shown in FIGS. 3 and 4, the cylinders 22 are coaxially aligned with the outer diameter of each cylinder 22 being substantially equal in magnitude to the inner diameter of the cylinder 22 adjacent thereto in the outer direction. The segments 24 of each cylinder 22 are configured and arranged in the same manner discussed above, to sustain a supporting magnetic circuit therein for the magnetic fields 18' that extend from pole faces on only one cylindrical surface of the magnetic structure 10'. Furthermore, the pole faces on adjacent cylinders 22 are radially aligned N with N and S with S, so that the magnetic fields 18' between such pole faces add vectorially to derive enhanced field magnitudes from the magnet structure 10'. In the magnetic circuits of FIGS. 3 and 4, the magnetic fields 18' extend from pole faces on only one cylindrical surface of the magnet structure 10'. However, the magnetic fields 18' extend from the outer cylindrical surface of the magnet structure 10' in FIG. 3 which therefore, would be incorporated on the rotor in electric machinery, while the magnetic fields 18' extend from the inner cylindrical surface of the magnetic structure 10' in FIG. 4 which therefore, would be incorporated on the stator in electric machinery.

Those skilled in the art will appreciate without any further explanation that within the concept of this invention, many modifications and variations are possible to the above disclosed embodiments of permanent magnet structures for electric machinery. Consequently, it should be understood that all such modifications and variations fall within the scope of the following claims.

What we claim is:

1. A permanent magnet structure for avoiding magnetic losses incurred from unutilized magnetic fields in electric machinery, comprising:
    at least one hollow cylinder of magnetic material having inner and outer cylindrical surfaces and constructed from a plurality of adjacently disposed and contiguous segments, each such segment having a substantially triangular cross section that includes a base on one cylindrical surface and a vertex on the other cylindrical surface, with the base and vertex respectively of any specific segment being located on the cylindrical surface opposite to that on which the base and vertex respectively of its adjacent segments are located, each said cylinder being magnetized to sustain a plurality of magnetic circuits, with each of said circuits including north and south pole faces and said pole faces for each said cylinder being disposed on only one cylindrical surface thereof.

2. The magnet structure of claim 1 wherein the material of said segments is magnetically rigid and flux contributions from at least three of said segments combine to sustain each said magnetic circuit.

3. The magnet structure of claim 2 wherein regarding each said at least three contributing segments, at least one said segment passes said magnetic circuit from said magnet structure in a radial direction through said only one cylindrical surface at a north pole face, at least one said segment receives said magnetic circuit into said magnet structure in a radial direction through said only one cylindrical surface at a south pole face, and at least one said segment passes said magnetic circuit within said magnet structure between at least said other two segments in a direction tangent to the cylindrical surface other than said only one cylindrical surface.

4. The magnet structure of claim 2 wherein regarding each said at least three contributing segments, at least one said segment passes said magnetic circuit from said magnet structure in a radial direction through said only one cylindrical surface at a north pole face, at least one said segment receives said magnetic circuit into said magnet structure in a radial direction through said only one cylindrical surface at a south pole face, and at least one said segment passes said magnetic circuit within said magnet structure between at lease said other two segments in a circular direction parallel to the cylindrical surface other than said only one cylindrical surface.

5. The magnet structure of claim 1 wherein each said segment extends longitudinally for the full length of its cylinder.

6. The magnet structure of claim 1 wherein said adjacently disposed segments in each said cylinder have interfacing boundaries extending between the cylindrical surfaces, said boundaries being oriented such that the vector components of magnetization directed perpendicularly thereto from said segments on either side thereof are equal and opposite in magnitude.

7. The magnet structure of claim 6 wherein said interfacing boundaries intersect at oblique angles with both cylindrical surfaces.

8. The magnet structure of claim 7 wherein said oblique angles are forty five degrees.

9. The magnet structure of claim 1 wherein said pole faces for each said cylinder are disposed on the outer cylindrical surface thereof.

10. The magnet structure of claim 9 wherein flux contributions from at least three of said segments combine to sustain each said magnetic circuit.

11. The magnet structure of claim 10 wherein regarding each said at least three contributing segments, at least one said segment passes said magnetic circuit from said magnet structure in a radial direction through said only one cylindrical surface at a north pole face, at least one said segment receives said magnetic circuit into said magnet structure in a radial direction through said only one cylindrical surface at a south pole face, and at least one said segment passes said magnetic circuit within said magnet structure between at least said other two segments in a direction tangent to the cylindrical surface other than said only one cylindrical surface.

12. The magnet structure of claim 10 wherein regarding each said at least three contributing segments, at least one said segment passes said magnetic circuit from said magnet structure in a radial direction through said only one cylindrical surface at a north pole face, at least one said segment receives said magnetic circuit into said magnet structure in a radial direction through said only one cylindrical surface at a south pole face, and at least one said segment passes said magnetic circuit within said magnet structure between at least said other two segments in a circular direction parallel to the cylindrical surface other than said only one cylindrical surface.

13. The magnet structure of claim 9 wherein each said segment extends longitudinally for the full length of its cylinder.

14. The magnet structure of claim 9 wherein said adjacently disposed segments in each said cylinder have interfacing boundaries extending between the cylindrical surfaces, said boundaries being oriented such that the vector components of magnetization directed perpendicularly thereto from said segments on either side thereof are equal and opposite in magnitude.

15. The magnet structure of claim 1 wherein said pole faces for each said cylinder are disposed on the inner cylindrical surface thereof.

16. The magnet structure of claim 15 wherein flux contributions from at least three of said segments combine to sustain each said magnetic circuit.

17. The magnet structure of claim 16 wherein regarding each said at least three contributing segments, at least one said segment passes said magnetic circuit from said magnet structure in a radial direction through said only one cylindrical surface at a north pole face, at least one said segment receives said magnetic circuit into said magnet structure in a radial direction through said only one cylindrical surface at a south pole face, and at least one said segment passes said magnetic circuit within said magnet structure between at least said other two segments in a direction tangent to the cylindrical surface other than said only one cylindrical surface.

18. The magnet structure of claim 16 wherein regarding each said at least three contributing segments, at least one said segment passes said magnetic circuit from said magnet structure in a radial direction through said only one cylindrical surface at a north pole face, at least one said segment receives said magnetic circuit into said magnet structure in a radial direction through said only one cylindrical surface at a south pole face, and at least one said segment passes said magnetic circuit within said magnet structure between at least said other two segments in a circular direction parallel to the cylindrical surface other than said only one cylindrical surface.

19. The magnet structure of claim 15 wherein each said segment extends longitudinally for the full length of its cylinder.

20. The magnet structure of claim 15 wherein said adjacently disposed segments in each said cylinder have interfacing boundaries extending between the cylindrical surfaces, said boundaries being oriented such that the vector components of magnetization directed perpendicularly thereto from said segments on either side thereof are equal and opposite in magnitude.

21. In electric machinery of the type having a rotor which turns relative to a stator and including a permanent magnet structure for avoiding magnetic losses incurred from unutilized magnetic fields, the improvement comprising:

said permanent magnet structure includes at least one hollow cylinder of magnetic material having inner and outer cylindrical surfaces and constructed from a plurality of adjacently disposed and contiguous segments, each such segment having a substantially triangular cross section that includes a base on one cylindrical surface and a vertex on the other cylindrical surface, with the base and vertex respectively of any specific segment being located on the cylindrical surface opposite to that on which the base and vertex respectively of its adjacent segments are located, each said cylinder being magnetized to sustain a plurality of magnetic circuits, with each of said circuits including north and south pole faces and said pole faces for each said cylinder being disposed on only one cylindrical surface thereof.

22. The electric machinery of claim 21 wherein the material of said segments is magnetically rigid and flux contributions from at least three of said segments combine to sustain each said magnetic circuit.

23. The electric machinery of claim 22 wherein regarding each said at least three contributing segments, at least one said segment passes said magnetic circuit from said magnet structure in a radial direction through said only one cylindrical surface at a north pole face, at least one said segment receives said magnetic circuit into said magnet structure in a radial direction through said only one cylindrical surface at a south pole face, and at least one said segment passes said magnetic circuit within said magnet structure between at least said other two segments in a direction tangent to the cylindrical surface other than said only one cylindrical surface.

24. The electric machinery of claim 22 wherein regarding each said at least three contributing segments, at least said segment passes said magnetic circuit from said magnet structure in a radial direction through said only one cylindrical surface at a north pole face, at least one said segment receives said magnetic circuit into said magnet structure in a radial direction through said only one cylindrical surface at a south pole face, and at least one said segment passes said magnetic circuit within said magnet structure between at least said other two segments in a circular direction parallel to the cylindrical surface other than said only one cylindrical surface.

25. The electric machinery of claim 21 wherein each said segment extends longitudinally for the full length of its cylinder.

26. The electric machinery of claim 21 wherein said adjacently disposed segments in each said cylinder have interfacing boundaries extending between the cylindrical surfaces, said boundaries being oriented such that the vector components of magnetization directed perpendicularly thereto from said segments on either side thereof are equal and opposite in magnitude.

27. The electric machinery of claim 21 wherein said permanent magnet structure is incorporated on said rotor, with said pole faces for each said cylinder disposed on the outer cylindrical surface thereof.

28. The electric machinery of claim 27 wherein flux contributions from at least three of said segments combine to sustain each said magnetic circuit.

29. The electric machinery of claim 28 wherein regarding each said at least three contributing segments, at least one said segment passes said magnetic circuit from said magnet structure in a radial direction through said only one cylindrical surface at a north pole face, at least one said segment receives said magnetic circuit into said magnet structure in a radial direction through said only one cylindrical surface at a south pole face, and at least one said segment passes said magnetic circuit within said magnet structure between at least said other two segments in a direction tangent to the cylindrical surface other than said only one cylindrical surface.

30. The electric machinery of claim 28 wherein regarding each said at least three contributing segments, at least one said segment passes said magnetic circuit from said magnet structure in a radial direction through said only one cylindrical surface at a north pole face, at least one said segment receives said magnetic circuit into said magnet structure in a radial direction through said only one cylindrical surface at a south pole face, and at least one said segment passes said magnetic circuit within said magnet structure between at least said other two segments in a circular direction parallel to the cylindrical surface other than said only one cylindrical surface.

31. The electric machinery of claim 27 wherein each said segment extends longitudinally for the full length of its cylinder.

32. The electric machinery of claim 27 wherein said adjacently disposed segments in each said cylinder have interfacing boundaries extending between the cylindrical surfaces, said boundaries being oriented such that the vector components of magnetization directed perpendicularly thereto from said segments on either side thereof are equal and opposite in magnitude.

33. The electric machinery of claim 21 wherein said permanent magnet structure is incorporated on said stator, with said pole faces for each said cylinder disposed on the inner cylindrical surface thereof.

34. The electric machinery of claim 33 wherein flux contributions from at least three of said segments combine to sustain each said magnetic circuit.

35. The electric machinery of claim 34 wherein regarding each said at least three contributing segments, at least one said segment passes said magnetic circuit from said magnet structure in a radial direction through said only one cylindrical surface at a north pole face, at least one said segment receives said magnetic circuit into said magnet structure in a radial direction through said only one cylindrical surface at a south pole face, and at least one said segment passes said magnetic circuit within said magnet structure between at least said other two segments in a direction tangent to the cylindrical surface other than said only one cylindrical surface.

36. The electric machinery of claim 34 wherein regarding each said at least three contributing segments, at least one said segment passes said magnetic circuit from said magnet structure in a radial direction through said only one cylindrical surface at a north pole face, at least one said segment receives said magnetic circuit into said magnet structure in a radial direction through said only one cylindrical surface at a south pole face, and at least one said segment passes said magnetic circuit within said magnet structure between at least said other two segments in a circular direction parallel to the cylindrical surface other than said only one cylindrical surface.

37. The electric machinery of claim 33 wherein each said segment extends longitudinally for the full length of its cylinder.

38. The electric machinery of claim 33 wherein said adjacently disposed segments in each said cylinder have interfacing boundaries extending between the cylindrical surfaces, said boundaries being oriented such that the vector components of magnetization directed perpendicularly thereto from said segments on either side thereof are equal and opposite in magnitude.

* * * * *